US008020830B2

(12) United States Patent
Oakes et al.

(10) Patent No.: US 8,020,830 B2
(45) Date of Patent: Sep. 20, 2011

(54) MOUNTING ASSEMBLIES FOR SECURING ELECTRONIC CONTROL UNIT AND VEHICLES INCLUDING SAME

(75) Inventors: Philip Arthur Oakes, Dublin, OH (US); R. Gregory Weimer, Dublin, OH (US); Thomas Howerton Pollock, Powell, OH (US); Camas Reed, Columbus, OH (US)

(73) Assignee: Honda Motor Company, Ltd., Tokyo (JP)

( * ) Notice: Subject to any disclaimer, the term of this patent is extended or adjusted under 35 U.S.C. 154(b) by 311 days.

(21) Appl. No.: 12/114,871

(22) Filed: May 5, 2008

(65) Prior Publication Data
US 2009/0272863 A1 Nov. 5, 2009

(51) Int. Cl.
*A47B 97/00* (2006.01)

(52) U.S. Cl. .................... 248/503; 248/218.4

(58) Field of Classification Search .............. 180/68.1, 180/68.5; 248/205.1, 309.1, 314, 27.1, 27.3, 248/225.21, 224.7, 224.8; 224/401, 459
See application file for complete search history.

(56) References Cited

U.S. PATENT DOCUMENTS

| 1,607,908 A | * | 11/1926 | Nelson | 429/99 |
|---|---|---|---|---|
| 3,380,698 A | * | 4/1968 | Goldberg et al. | 248/229.26 |
| 3,809,799 A | * | 5/1974 | Taylor | 174/68.3 |
| 4,531,606 A | * | 7/1985 | Watanabe | 180/210 |
| 4,582,157 A | * | 4/1986 | Watanabe | 180/215 |
| 4,881,150 A | * | 11/1989 | Oyamada | 361/814 |
| 4,957,264 A | * | 9/1990 | Hakanen | 248/510 |
| 4,981,243 A | * | 1/1991 | Rogowski | 224/431 |
| 5,117,932 A | | 6/1992 | Kurosu et al. | |
| 5,208,728 A | | 5/1993 | Schirmer | |
| 5,379,970 A | | 1/1995 | Linthicum et al. | |
| 5,417,471 A | | 5/1995 | Kreis et al. | |
| 5,536,595 A | * | 7/1996 | Inkmann et al. | 429/120 |
| 5,586,907 A | * | 12/1996 | Frantz et al. | 439/500 |
| 5,671,802 A | | 9/1997 | Rogers | |
| 5,675,397 A | * | 10/1997 | Fukushima | 349/149 |
| RE36,075 E | * | 2/1999 | Jonic | 340/426.34 |
| 5,996,543 A | | 12/1999 | Nakayama et al. | |
| 6,008,454 A | | 12/1999 | Kawakita | |
| 6,062,901 A | * | 5/2000 | Liu et al. | 439/500 |
| 6,133,531 A | * | 10/2000 | Hayduke et al. | 174/67 |
| 6,247,435 B1 | | 6/2001 | Munz et al. | |
| 6,301,097 B1 | | 10/2001 | Ellsworth, Jr. et al. | |
| 6,382,174 B1 | | 5/2002 | Nezu et al. | |
| 6,390,429 B1 | * | 5/2002 | Brincat | 248/309.1 |
| 6,513,479 B2 | | 2/2003 | Nozaki et al. | |
| 6,586,674 B2 | | 7/2003 | Krause et al. | |
| 6,600,653 B2 | | 7/2003 | Koike et al. | |
| 6,783,040 B2 | * | 8/2004 | Batchelor | 224/413 |
| 6,807,060 B2 | | 10/2004 | Glovatsky et al. | |
| 7,113,400 B2 | | 9/2006 | Nagata et al. | |
| 7,371,108 B2 | * | 5/2008 | Sun | 439/500 |
| 2009/0000841 A1 | * | 1/2009 | Reed et al. | 180/68.5 |
| 2009/0004554 A1 | * | 1/2009 | Reed et al. | 429/97 |
| 2009/0178868 A1 | * | 7/2009 | Oohashi | 180/68.5 |

* cited by examiner

*Primary Examiner* — Amy Sterling
*Assistant Examiner* — Erin W Smith
(74) *Attorney, Agent, or Firm* — Ulmer & Berne LLP

(57) ABSTRACT

A mounting assembly secures an electronic control unit upon a vehicle. The mounting assembly includes a bracket which can be attached to the vehicle's frame. The electronic control unit can be supported by the bracket. In one embodiment, a sleeve can be secured to the bracket and the electronic control unit can be at least partially disposed within a receptacle in the sleeve. In another embodiment, a guard can be secured to the sleeve.

19 Claims, 5 Drawing Sheets

MOUNTING ASSEMBLIES FOR SECURING ELECTRONIC CONTROL UNIT AND VEHICLES INCLUDING SAME

TECHNICAL FIELD

A mounting assembly is provided for securing and protecting an electronic control unit upon a vehicle.

BACKGROUND

Many conventional vehicles include an electronic control unit ("ECU") which is configured to control an engine, transmission, and/or some other electrical and/or electromechanical system provided upon the vehicle. Conventional arrangements for mounting an ECU upon a vehicle can be overly complicated, bulky, expensive, and/or heavy, and/or can render the ECU susceptible to damage.

SUMMARY

In accordance with one embodiment, a mounting assembly is provided for securing an electronic control unit upon a vehicle. The mounting assembly comprises a bracket and a sleeve. The bracket comprises a plurality of tabs. The bracket is configured for attachment to a vehicular frame. The sleeve defines a receptacle and a plurality of extension portions. Each of the extension portions defines a respective channel. Respective ones of the channels receive respective ones of the tabs to facilitate attachment of the sleeve to the bracket. The receptacle is configured to receive at least a portion of an electronic control unit.

In accordance with another embodiment, a vehicle comprises a frame, a bracket, a sleeve, and an electronic control unit. The bracket is attached to the frame and comprises a plurality of tabs. The sleeve defines a receptacle and a plurality of extension portions. Each of the extension portions defines a respective channel. Respective ones of the channels receive respective ones of the tabs to facilitate attachment of the sleeve to the bracket. The electronic control unit is at least partially disposed within the receptacle.

In accordance with yet another embodiment, a vehicle comprises a frame, a bracket, an electronic control unit, and a guard. The bracket is attached to the frame. The electronic control unit is supported by the bracket. The guard is supported by the bracket. In one embodiment, a sleeve can be secured to the bracket, the sleeve can define a receptacle within which the electronic control unit can be at least partially disposed, and the guard can be secured to the sleeve.

BRIEF DESCRIPTION OF THE DRAWINGS

It is believed that certain embodiments will be better understood from the following description taken in conjunction with the accompanying drawings in which.

DETAILED DESCRIPTION

Figure 1:
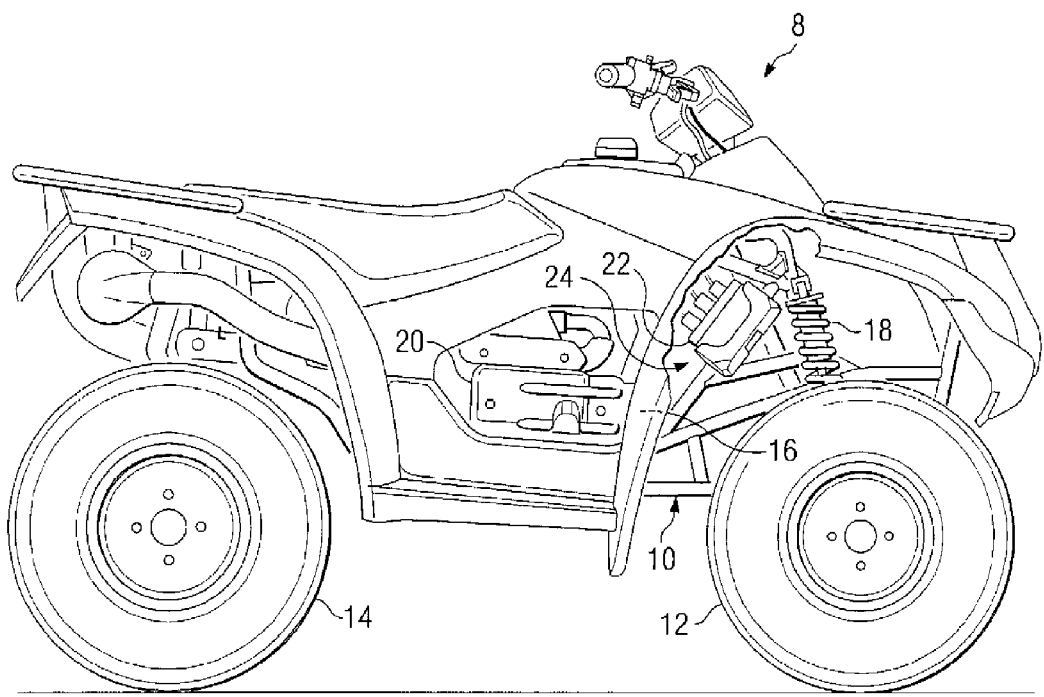
FIG. 1 is a side elevational view depicting an all terrain vehicle ("ATV") having an ECU and a mounting assembly in accordance with one embodiment.

Embodiments are hereinafter described in detail in connection with the views and examples of FIGS. 1-7, wherein like numbers indicate the same or corresponding elements throughout the views. A mounting assembly can be provided to facilitate attachment of an ECU to a frame and/or another component of a vehicle. Such a vehicle can comprise, for example, an automobile, a truck, a van, a scooter, a recreational vehicle, an aircraft, agricultural equipment, construction equipment, a toy, or a mower. In one embodiment, as shown in FIG. 1, the vehicle comprises an ATV 8. Though the ATV can include four wheels (e.g., including a front wheel 12 and a rear wheel 14), it will be appreciated that an ATV or other vehicle can alternatively include more than four wheels or less than four wheels.

The mounting assembly can have any of a variety of suitable configurations, and can be attached to a vehicle's frame in any of a variety of suitable locations and arrangements. In one such configuration, the mounting assembly can be attached directly to the vehicle's frame such as with bolts and/or welding, for example. In another such configuration, a mounting assembly might be indirectly attached to a vehicle's frame. Such indirect attachment can be achieved such as through direct attachment (e.g., with bolts) of the mounting assembly to one of the vehicle's body panels which, in turn, can be attached directly (e.g., with other bolts) to the vehicle's frame.

Figure 3:
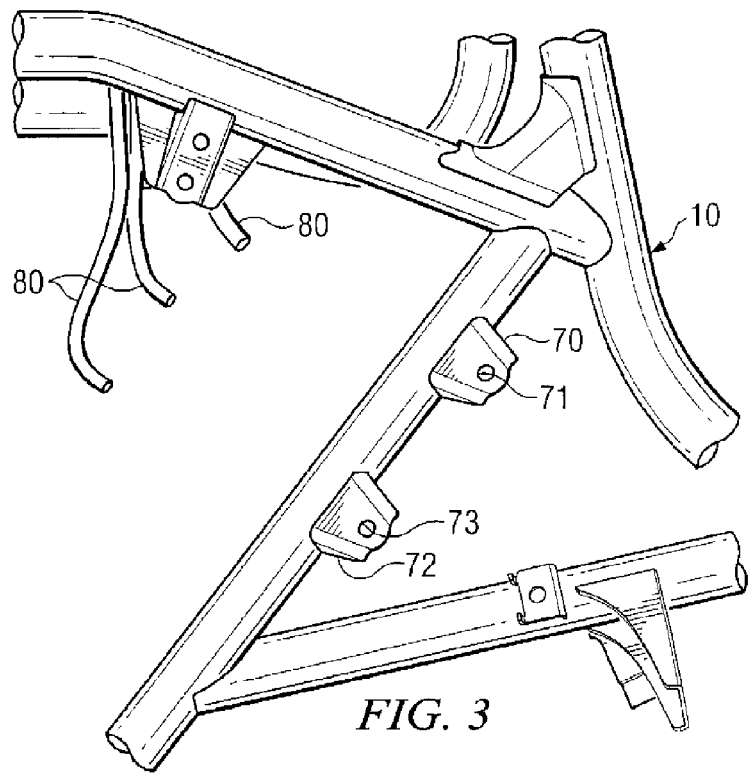
FIG. 3 is an enlarged side elevational view depicting a portion of the ATV of FIG. 1, wherein certain components of the ATV, including the ECU and the mounting assembly, are removed for clarity of illustration.
Figure 4:
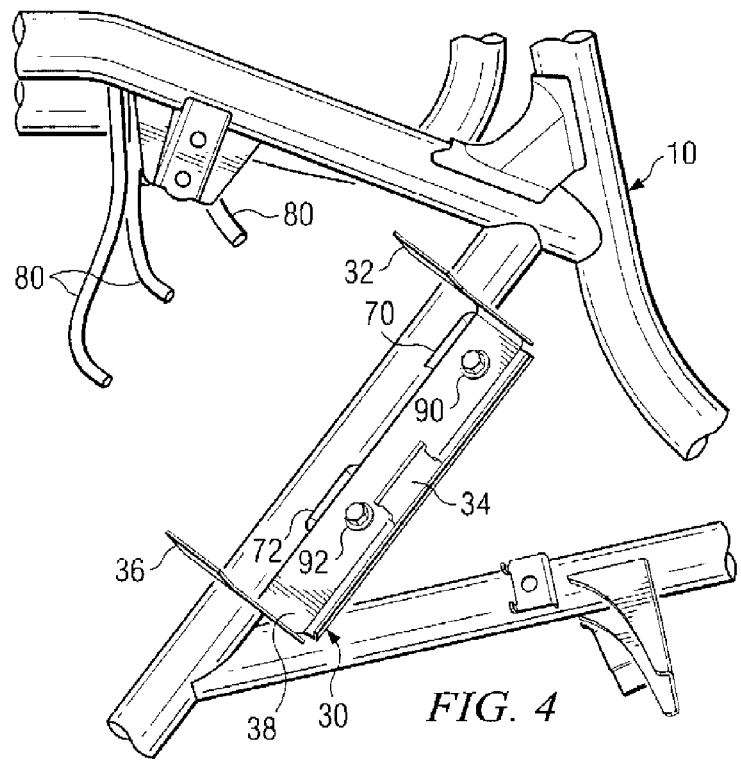
FIG. 4 is an enlarged side elevational view depicting a portion of the ATV of FIG. 1, wherein certain components of the ATV, including the ECU and the sleeve and the guard of the mounting assembly, are removed for clarity of illustration.

In one embodiment, as shown in FIGS. 4-7, a mounting assembly 24 can include a bracket 30. The bracket 30 can include a base portion 38 which defines mounting apertures (e.g., 60, 62 in FIG. 7). Bolts (e.g., 90, 92) or other fasteners can pass through the mounting apertures (e.g., 60, 62) to facilitate attachment of the bracket 30 to a frame 10 or another portion of the ATV 8. In one embodiment, as shown in FIG. 3, the frame 10 can include stays 70, 72 which define respective stay apertures 71, 73. The stay apertures 71, 73 can comprise threaded apertures. The bolts 90, 92 can pass through the respective mounting apertures 60, 62 and into the respective stay apertures 71, 73 to facilitate attachment of the bracket 30, and thus the mounting assembly 24, to the stays 70, 72 of the frame 10. In another embodiment, bolts can pass through mounting apertures in a bracket and into threaded apertures in a tubular member of a vehicle's frame. In yet another alternative embodiment, a bracket might not include mounting apertures, but can be configured for attachment to a frame or another portion of a vehicle in any of a variety of other suitable configurations. For example, a bracket can be configured to be welded and/or otherwise adhered to a vehicle's frame. In another example, a bracket can be configured for attachment to a body panel of a vehicle such as with adhesives and/or interlocking mechanical features.

The bracket 30 can comprise multiple tabs (e.g., 32, 34, 36) which each extend from the base portion 38. In one embodiment, such as that shown in FIGS. 4 and 7, the tabs 32, 34, 36 can be provided integrally with the base portion 38 such as by way of a stamping or casting process. In another embodiment, the tabs can be attached to the base portion though use of adhesives, fasteners, welding or otherwise. The bracket 30 can be formed from metal (e.g., steel), plastic, carbon fiber, and/or any of a variety of other materials or combinations thereof.

Figure 5:
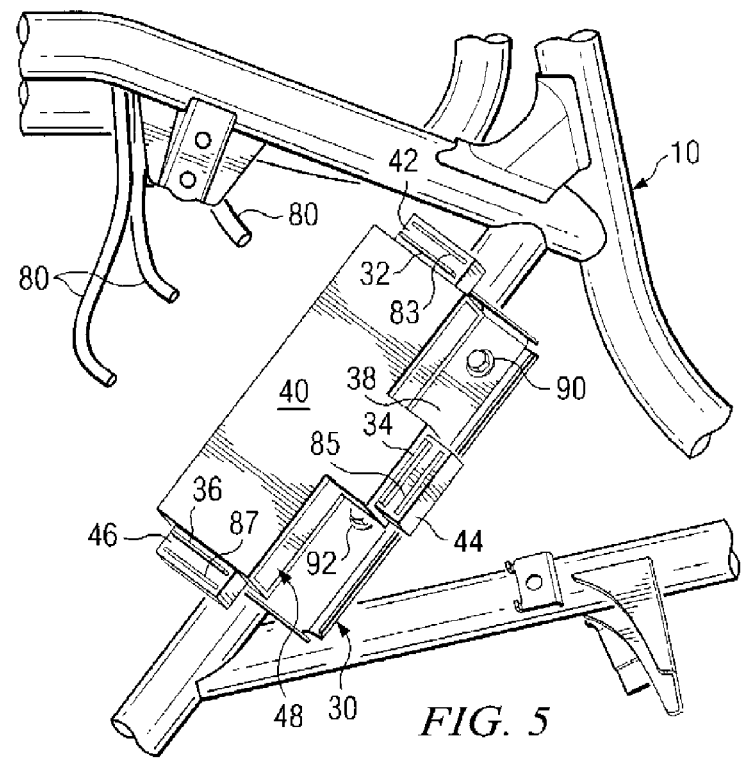
FIG. 5 is an enlarged side elevational view depicting a portion of the ATV of FIG. 1, wherein certain components of the ATV, including the ECU and the guard of the mounting assembly, are removed for clarity of illustration.
Figure 6:
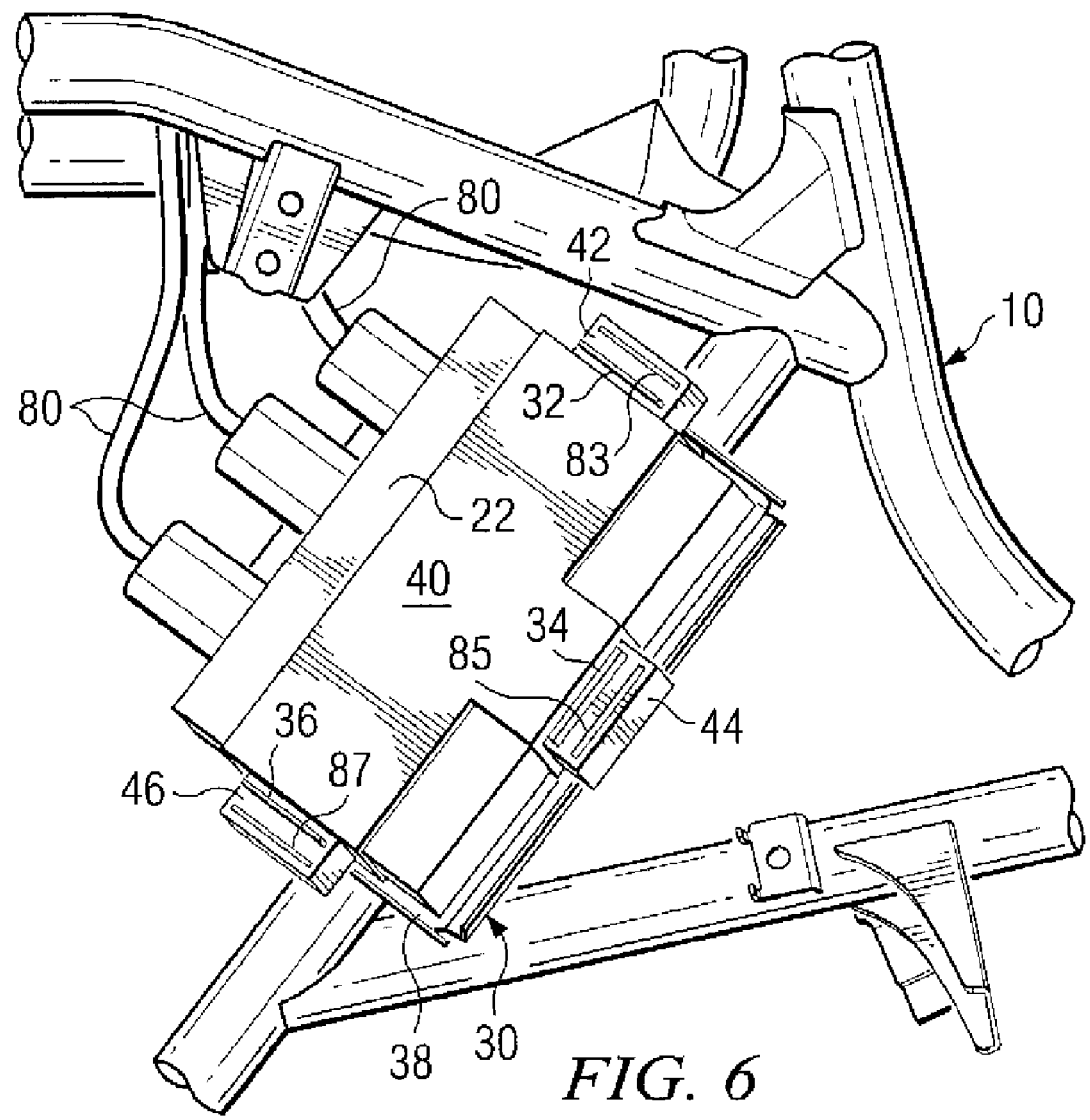
FIG. 6 is an enlarged side elevational view depicting a portion of the ATV of FIG. 1, wherein certain components of the ATV, including the guard of the mounting assembly, are removed for clarity of illustration.
Figure 7:
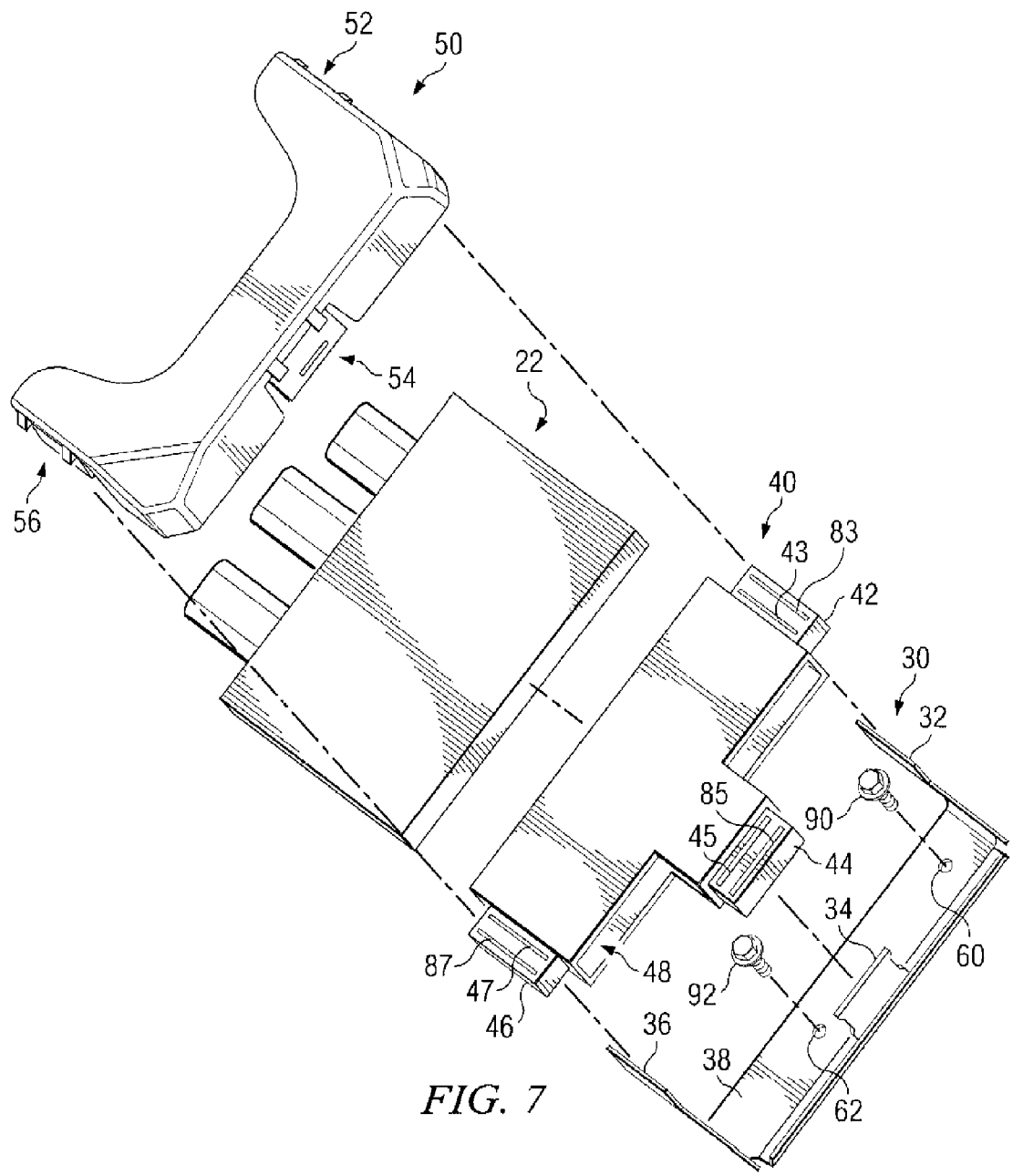
FIG. 7 is an exploded perspective view depicting the ECU and the mounting assembly of FIGS. 1-2.

The mounting assembly 24 can additionally include a sleeve 40. The sleeve 40 can define multiple extension portions (e.g., 42, 44, 46). Each of the extension portions 42, 44, 46 can define a respective channel 43, 45, 47, as shown in FIG. 7. Respective ones of the channels 43, 45, 47 can receive respective ones of the tabs 32, 34, 36 to facilitate attachment of the sleeve 40 to the bracket 30, as shown in FIGS. 5-6. In one embodiment, respective ones of the channels 43, 45, 47 can receive respective ones of the tabs 32, 34, 36 in an interference fit to facilitate attachment of the sleeve 40 to the bracket 30. In this configuration, the sleeve 40 can be entirely supported upon the ATV 8 by way of the bracket 30 such that the sleeve 40 need not be attached to any other portion of the mounting assembly 24 and/or the ATV 8 to facilitate securement of the sleeve 40 with respect to the frame 10 of the ATV 8. It will be appreciated that a sleeve can be secured to a bracket in any of a variety of alternative configurations. A sleeve can be formed from a resilient material such as rubber, for example. However, a sleeve might alternatively be formed from any of a variety of other materials.

The sleeve 40 can define a receptacle 48 which is configured to receive at least a portion of an ECU 22, as shown in FIGS. 2 and 5-7. The sleeve 40 can be configured to retain the ECU 22 within the receptacle 48 by interference fit. However, an ECU might additionally or alternatively be retained at least partially within a receptacle of a sleeve though use of fasteners, adhesives, and/or interlocking mechanical features. It will be appreciated that, when the sleeve 40 is formed from a resilient material, the sleeve 40 can resiliently support the ECU 22 such that vibrations and/or shocks are not transmitted from the frame 10 to the ECU 22. In this manner, the sleeve 40 can accordingly provide some protection for the ECU 22 from vibrations and shocks, and can accordingly reduce any likelihood of premature failure of the ECU 22. Also, by covering a significant portion of the ECU 22, as shown in FIGS. 2-6, the sleeve 40 can serve as a shell to protect the ECU 22 from certain impacts, and can also serve to insulate at least certain portions of the ECU 22 from heat radiated by other components (e.g., an engine 20) of the ATV 8.

By disposing the ECU 22 within the receptacle 48 of the sleeve 40, attaching the sleeve 40 to the bracket 30, and attaching the bracket 30 to the frame 10, it will be appreciated that the ECU 22 can thereby be secured to the frame 10 by the mounting assembly 24. However, an ECU may be secured with respect to a frame and/or other component(s) of a vehicle through use of a mounting assembly having any of a variety of other configurations.

It will be appreciated that the ECU 22 can be configured to control an engine (e.g., 20 in FIG. 1), transmission, and/or some other electrical and/or electromechanical components and/or systems provided upon the ATV 8. Those components and/or systems can communicate with the ECU 22 through use of wires (e.g., 80) and/or wirelessly.

Figure 2:
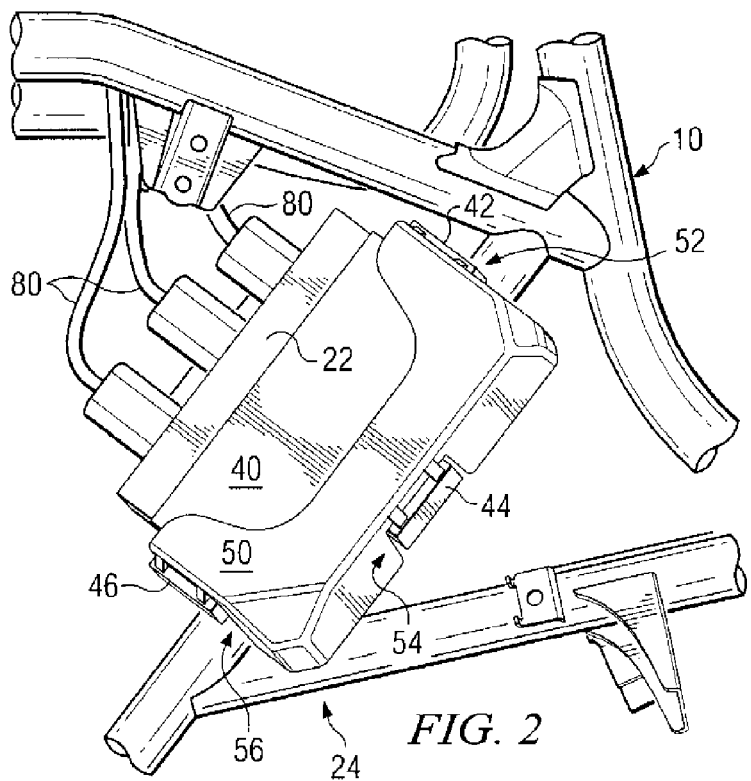
FIG. 2 is an enlarged side elevational view depicting a portion of the ATV of FIG. 1, wherein certain components of the ATV are removed for clarity of illustration, and wherein portions of the ECU and the mounting assembly are depicted.

The mounting assembly 24 can also include a guard 50. The guard 50 can be attached to the sleeve 40 and/or the bracket 30 in any of a variety of suitable configurations. For example, the guard 50 can include multiple projecting portions (e.g., 52, 54, 56), as shown in FIGS. 2 and 7. The projecting portions 52, 54, 56 can facilitate attachment of the guard 50 to the sleeve 40 and/or the bracket 30. For example, at least some of the extension portions of the sleeve can each define multiple channels. In particular, with reference to FIG. 7, the extension portion 42 is shown to define the channel 43 and another channel 83, the extension portion 44 is shown to define the channel 45 and another channel 85, and the extension portion 46 is shown to define the channel 47 and another channel 87. In one embodiment, multiple channels (e.g., 43, 83) defined by an extension portion (e.g., 42) can extend generally parallel with one another (e.g., see FIG. 7). Respective ones of the channels 83, 85, 87 of the sleeve 40 can be configured to receive respective ones of the projecting portions 52, 54, 56 of the guard 50 (e.g., in a snap-fit or interference fit arrangement) to facilitate securement of the guard 50 to the sleeve 40, and thus to the bracket 30, as shown in FIG. 2.

The sleeve 40 can accordingly facilitate attachment of the guard 50 to the bracket 30, and thus to the frame 10. In this configuration, the guard 50 can be entirely supported by the sleeve 40 such that the guard 50 need not be attached to any other portion of the mounting assembly 24 and/or the ATV 8 to facilitate securement of the guard 50 with respect to the frame 10 of the ATV 8. The ECU 22 and the guard 50 can thus both be supported by the bracket 30 such as by way of the sleeve 40. It will be appreciated that projecting portions of a guard can facilitate attachment of a guard to extension portions of a sleeve in any of a variety of other suitable configurations. It will also be appreciated that a guard can be attached to a sleeve, an ECU, and/or a bracket in any of a variety of other suitable configurations.

In one embodiment, the guard can be formed from plastic such as through injection molding, thermoforming, or some other suitable process. Forming a guard from plastic, for example, can achieve efficiencies in terms of manufacturability, cost, weight, and simplicity. Also, a plastic guard can often absorb impact without sustaining damage, and without transmitting the impact to components (e.g., an ECU, sleeve, and/or bracket) protected by the guard. However, it will be appreciated that a guard might alternatively be formed from metal, carbon fiber, and/or any of a variety of other suitable materials or combinations thereof.

In the example of FIG. 1, it can be seen that the mounting assembly 24 supports the ECU 22 at a location above the front wheel 12, behind a front suspension element 18, and ahead of and below a fender 16. In this position, the mounting assembly 24 can cooperate with the fender 16 to protect the ECU 22 from impact by debris, and can additionally cooperate to protect the ECU 22 from exposure to heat radiated by other components of the ATV 8 (e.g., the engine 20). In particular, the guard 50 is shown in FIGS. 1-2 to be supported by the sleeve 40 and the bracket 30 such that the guard 50 is positioned forwardly of the ECU 22 for protecting the ECU 22 from impact with debris (e.g., dirt, rocks, sticks) thrown by the front wheel 12 of the ATV 8 (such as during forward motion of the ATV). The guard 50 and/or the sleeve 40 can also be positioned and configured to shield the ECU 22 from heat sources (e.g., the engine 20) present upon the ATV 8. While the guard 50 is shown in FIG. 2 to comprise substantially continuous surfaces, it will be appreciated that a guard might alternatively include multiple apertures (not shown) in those surfaces which are sized and positioned to facilitate passage of air for cooling an ECU, although the size of these apertures can be sufficiently small such that debris (e.g., thrown by wheels of the vehicle) is unlikely to pass through the apertures. Likewise, while the sleeve 40 is shown in FIGS. 2 and 5-7 to comprise substantially continuous surfaces, it will be appreciated that a sleeve might alternatively include multiple apertures (not shown) in those surfaces which are sized and positioned to facilitate passage of air for cooling an ECU, although the size of these apertures can be sufficiently small such that debris (e.g., thrown by wheels of the vehicle) is unlikely to pass through the apertures. It will be appreciated that a mounting assembly in accordance with another embodiment can facilitate support and protection of an ECU at any of a variety of other suitable positions upon an ATV or other vehicle.

In the example of FIG. 7, the bracket 30 is shown to include three tabs 32, 34, 36, the sleeve 40 is shown to define three corresponding extension portions 42, 44, 46, and the guard 50 is shown to include three corresponding projecting portions 52, 54, 56. However, it will be appreciated that an alternative mounting assembly might include fewer than three corresponding tabs, extension portions, and/or projecting portions, or more than three corresponding tabs, extension portions, and/or projecting portions, and that these features can be provided in any of a variety of suitable configurations. For example, a bracket might include a tab and a channel which are configured to correspondingly engage a channel and tab of a sleeve to facilitate attachment of the sleeve to the bracket. In yet other alternative embodiments, a mounting assembly might include: certain tab(s) which do not correspond with any extension portion(s) and/or projecting portion(s); certain extension portion(s) which do not correspond with any tab(s) and/or projecting portion(s); and/or certain projecting portion(s) which do not correspond with any tab(s) and/or extension portion(s).

It will also be appreciated that, by attaching multiple respective components (i.e., bracket 30, sleeve 40 and guard 50) to provide the mounting assembly 24, many advantages can be achieved. For example, optimal materials can be selected for forming each of the respective components of the mounting assembly 24, such that each of those respective components can effectively perform its respective intended function. For example, as described above, the bracket 30 can be formed from metal, the sleeve 40 can be formed from rubber, and the guard 50 can be formed from plastic. Working together, these components can surround a substantial portion of the ECU 22 while securing the ECU 22 to the frame 10 of the ATV 8. These components can accordingly protect the ECU 22 from impact as described above, and can additionally serve to insulate the ECU 22 from at least some vibrations and heat as also discussed above. In addition, these components can be easily and quickly attached to the frame 10 of the ATV 8 and with respect to one another. The components of the mounting assembly 24 can also be provided inexpensively. As such, it will be appreciated that the mounting assembly 24 can facilitate simple, quick, and inexpensive attachment of the ECU 22 to the frame 10 of the ATV 8 and can also provide effective protection of the ECU 22 from impact, vibration, and heat.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A mounting assembly for securing an electronic control unit upon a vehicle, the mounting assembly comprising:
   a bracket comprising a plurality of tabs, the bracket being configured for attachment to a vehicular frame;
   a sleeve defining a receptacle and a plurality of channels; and
   a guard, the guard comprising a plurality of projecting portions; wherein
   each of the tabs extends through a respective one of the channels to facilitate attachment of the sleeve to the bracket, and wherein the receptacle is configured to receive at least a portion of an electronic control unit,
   the sleeve comprises a plurality of extension portions, the extension portions defining the channels; and
   each of the projecting portions of the guard is received by a respective one of the channels defined by the extension portions of the sleeve to facilitate attachment of the guard to the sleeve.

2. The mounting assembly of claim 1 wherein:
   at least some of the extension portions of the sleeve each define a pair of the channels;
   for each of the at least some of the extension portions of the sleeve, a first one of the pair of the channels receives a respective one of the tabs of the bracket and a second one of the pair of the channels receives a respective one of the projecting portions of the guard; and
   for each of the at least some of the extension portions of the sleeve, the first one of the pair of the channels extends generally parallel with the second one of the pair of the channels.

3. The mounting assembly of claim 1 wherein the bracket comprises metal, the sleeve comprises a resilient material, and the guard comprises plastic.

4. The mounting assembly of claim 1 further comprising a fastener, wherein the bracket further comprises a base portion from which each of the tabs extends, the base portion defines a mounting aperture, and the fastener is configured for passage through the mounting aperture and into a threaded aperture in a vehicular frame.

5. The mounting assembly of claim 1 wherein the sleeve is configured to retain an electronic control unit within the receptacle by interference fit.

6. A vehicle comprising:
   a frame;
   a bracket attached to the frame and comprising a plurality of tabs;
   a sleeve defining a receptacle and a plurality of channels, wherein each of the channels receives a respective one of the tabs to facilitate attachment of the sleeve to the bracket;
   an electronic control unit at least partially disposed within the receptacle; and
   a guard, the guard comprising a plurality of projecting portions; wherein
   the sleeve comprises a plurality of extension portions, the extension portions defining the channels; and each of the projecting portions of the guard is received by a respective one of the channels defined by the extension portions of the sleeve to facilitate attachment of the guard to the sleeve.

7. The vehicle of claim 6 wherein:
at least some of the extension portions of the sleeve each define a pair of the channels;
for each of the at least some of the extension portions of the sleeve, a first one of the pair of the channels receives a respective one of the tabs of the bracket and a second one of the pair of the channels receives a respective one of the projecting portions of the guard; and
for each of the at least some of the extension portions of the sleeve, the first one of the pair of the channels extends generally parallel with the second one of the pair of the channels.

8. The vehicle of claim 6 wherein the bracket comprises metal, the sleeve comprises a resilient material, and the guard comprises plastic.

9. The vehicle of claim 6 wherein the guard is positioned forwardly of the electronic control unit upon the vehicle such that the guard is configured to protect the electronic control unit from impact with debris thrown by a front wheel of the vehicle.

10. The vehicle of claim 6 wherein the sleeve is configured to retain the electronic control unit within the receptacle by interference fit.

11. The vehicle of claim 6 being an all terrain vehicle, and further comprising an engine, wherein;
the electronic control unit communicates with the engine and is configured to control the engine; and
the frame comprises a stay, and wherein the bracket is attached to the stay.

12. The vehicle of claim 11 further comprising a fastener, wherein the bracket further comprises a base portion from which each of the tabs extends, the base portion defines a mounting aperture, the stay defines a stay aperture, and the fastener passes into each of the mounting aperture and the stay aperture.

13. A vehicle comprising:
a frame;
a bracket attached to the frame;
a sleeve defining a receptacle and secured to the bracket;
an electronic control unit supported by the bracket, the electronic control unit being at least partially disposed within the receptacle: and
a guard comprising a plurality of projecting portions configured to facilitate securement of the guard to the sleeve.

14. The vehicle of claim 13 wherein the electronic control unit is at least partially disposed within the receptacle.

15. The vehicle of claim 13 wherein the bracket comprises metal and the guard comprises plastic.

16. The vehicle of claim 13 being an all terrain vehicle and further comprising a fastener, wherein the frame comprises a stay, the stay defines a stay aperture, the bracket defines a mounting aperture, and the fastener passes into each of the mounting aperture and the stay aperture.

17. The vehicle of claim 13 wherein the guard is positioned forwardly of the electronic control unit upon the vehicle such that the guard is configured to protect the electronic control unit from impact with debris thrown by a front wheel of the vehicle.

18. The vehicle of claim 14 further comprising:
a front wheel;
a front suspension element; and
a fender, wherein
the electronic control unit is supported at a location above the front wheel, behind the suspension element and below the fender, the fender cooperating with at least one of the sleeve and the guard to protect the electronic control unit from impact by debris during operation of the vehicle.

19. The vehicle of claim 18, further comprising:
an engine; wherein
the electronic control unit communicates with the engine and is configured to control the engine.

* * * * *

UNITED STATES PATENT AND TRADEMARK OFFICE
CERTIFICATE OF CORRECTION

| | | |
|---|---|---|
| PATENT NO. | : 8,020,830 B2 | Page 1 of 1 |
| APPLICATION NO. | : 12/114871 | |
| DATED | : September 20, 2011 | |
| INVENTOR(S) | : Philip Arthur Oakes et al. | |

It is certified that error appears in the above-identified patent and that said Letters Patent is hereby corrected as shown below:

Claim 1, column 6, line 22, change "unit," to -- unit; --;
Claim 11, column 7, line 29, change "wherein;" to -- wherein: --;
Claim 13, column 8, line 7, change "receptacle:" to -- receptacle; --; and
Claim 18, column 8, line 28, change "fender," to -- fender; --.

Signed and Sealed this
Tenth Day of January, 2012

David J. Kappos
*Director of the United States Patent and Trademark Office*